(12) United States Patent
Strock

(10) Patent No.: US 9,581,042 B2
(45) Date of Patent: Feb. 28, 2017

(54) COMPOSITE ARTICLE HAVING METAL-CONTAINING LAYER WITH PHASE-SPECIFIC SEED PARTICLES AND METHOD THEREFOR

(71) Applicant: Christopher W. Strock, Kennebunk, ME (US)

(72) Inventor: Christopher W. Strock, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 1404 days.

(21) Appl. No.: 13/663,774

(22) Filed: Oct. 30, 2012

(65) Prior Publication Data
US 2015/0354405 A1    Dec. 10, 2015

(51) Int. Cl.
| | |
|---|---|
| B32B 5/16 | (2006.01) |
| F01D 25/00 | (2006.01) |
| C22C 21/00 | (2006.01) |
| F01D 5/28 | (2006.01) |

(52) U.S. Cl.
CPC ............ *F01D 25/007* (2013.01); *C22C 21/00* (2013.01); *F01D 5/282* (2013.01); *F01D 5/284* (2013.01); *F01D 5/288* (2013.01); *F01D 25/005* (2013.01); *F05D 2300/6032* (2013.01); *F05D 2300/6033* (2013.01); *Y02T 50/672* (2013.01); *Y10T 428/257* (2015.01)

(58) Field of Classification Search
CPC ....... F01D 5/286; F01D 25/007; F01D 25/005
USPC .......................................................... 148/531
See application file for complete search history.

(56) References Cited

U.S. PATENT DOCUMENTS

| | | | |
|---|---|---|---|
| 2,941,781 A | * | 6/1960 | Boyum ................. F01D 25/162 415/142 |
| 3,612,387 A | | 10/1971 | Rathbun |
| 4,096,296 A | | 6/1978 | Galmiche et al. |
| 4,676,994 A | | 6/1987 | Demaray |
| 4,681,818 A | | 7/1987 | Unnam et al. |
| 4,828,872 A | | 5/1989 | Bauer et al. |
| 4,857,798 A | | 8/1989 | Ford |
| 5,087,477 A | | 2/1992 | Giggins, Jr. et al. |

(Continued)

FOREIGN PATENT DOCUMENTS

| | | |
|---|---|---|
| DE | 19632410 | 4/1997 |
| EP | 0926257 | 6/1999 |

(Continued)

OTHER PUBLICATIONS

Giolli, C., Scrivani, A., Giorgetti, A., Bonferroni, B., Bolelli, G., Kim, G. (2011). Milling and cryo-milling affecting MCrAlY high temperature oxidation mechanism. International Thermal Spray Conference & Exposition.

(Continued)

*Primary Examiner* — Craig Kim
*Assistant Examiner* — Jason Fountain
(74) *Attorney, Agent, or Firm* — Carlson, Gaskey & Olds, P.C.

(57) ABSTRACT

A composite article includes a substrate and a metal-containing layer on the substrate. The metal of the metal-containing layer is oxidizable to a plurality of different oxide phases. The metal-containing layer includes a plurality of phase-specific seed particles promoting formation of a selected one of the different oxide phases.

22 Claims, 3 Drawing Sheets

(56) References Cited

U.S. PATENT DOCUMENTS

| | | | |
|---|---|---|---|
| 5,180,612 A | 1/1993 | Rendell | |
| 5,185,012 A | 2/1993 | Kelly | |
| 5,556,438 A * | 9/1996 | Kardys | B24D 3/002 51/294 |
| 5,601,652 A | 2/1997 | Mullin et al. | |
| 5,645,893 A | 7/1997 | Rickerby et al. | |
| 5,716,720 A | 2/1998 | Murphy | |
| 5,763,008 A | 6/1998 | Sarin et al. | |
| 5,876,470 A * | 3/1999 | Abrahamson | B24D 3/00 51/307 |
| 5,998,003 A | 12/1999 | Courtright et al. | |
| 6,177,200 B1 | 1/2001 | Maloney | |
| 6,296,945 B1 | 10/2001 | Subramanian | |
| 6,319,556 B1 | 11/2001 | Olsen et al. | |
| 6,478,888 B1 | 11/2002 | Burns | |
| 6,485,845 B1 * | 11/2002 | Wustman | C23C 28/00 416/241 B |
| 6,508,632 B1 | 1/2003 | Conte et al. | |
| 6,589,351 B1 | 7/2003 | Bruce et al. | |
| 6,983,718 B1 | 1/2006 | Bruce et al. | |
| 7,022,948 B2 | 4/2006 | Shang et al. | |
| 7,166,168 B1 | 1/2007 | Heller et al. | |
| 8,080,231 B2 * | 12/2011 | Wang | B82Y 30/00 216/88 |
| 2001/0055653 A1 | 12/2001 | Dopper | |
| 2002/0110698 A1 | 8/2002 | Singh | |
| 2002/0152961 A1 | 10/2002 | Burns | |
| 2003/0041928 A1 | 3/2003 | Spitsberg et al. | |
| 2003/0113478 A1 | 6/2003 | Dang et al. | |
| 2003/0203127 A1 | 10/2003 | Bruce et al. | |
| 2006/0062912 A1 | 3/2006 | Wortman et al. | |
| 2006/0196414 A1 | 9/2006 | Schumacher et al. | |
| 2007/0234959 A1 | 10/2007 | Nakanishi et al. | |
| 2008/0292873 A1 | 11/2008 | Nijdam et al. | |
| 2010/0047474 A1 | 2/2010 | Neal et al. | |
| 2010/0068417 A1 | 3/2010 | Neal et al. | |
| 2010/0189929 A1 | 7/2010 | Neal et al. | |
| 2010/0247809 A1 | 9/2010 | Neal | |
| 2010/0247952 A1 * | 9/2010 | Latour | C23C 8/02 428/623 |
| 2011/0217560 A1 | 9/2011 | Ridgeway | |
| 2011/0250367 A1 | 10/2011 | Neal | |

FOREIGN PATENT DOCUMENTS

| | | |
|---|---|---|
| EP | 0937786 | 8/1999 |
| EP | 0969117 | 1/2000 |
| EP | 1621647 | 2/2006 |
| EP | 1734148 | 12/2006 |
| EP | 1746185 | 1/2007 |
| EP | 1908857 | 4/2008 |
| EP | 2157204 | 2/2010 |
| EP | 2236642 | 10/2010 |
| EP | 2236652 | 10/2010 |
| JP | 2006045674 | 2/2006 |
| JP | 2006328499 | 12/2006 |
| JP | 2007192219 | 8/2007 |
| WO | 0157288 | 8/2001 |
| WO | 0236844 | 5/2002 |
| WO | 03028428 | 4/2003 |
| WO | 2004011688 | 2/2004 |
| WO | 2004048632 | 6/2004 |

OTHER PUBLICATIONS

Nijdam, T.J and Sloof W.G. (2006). Combined pre-annealing and pre-oxidation treatment for the processing of thermal barrier coatings on NiCoCrAlY bond coatings. Surface & Coatings Technology 201 (2006) 3894-3900.

Nijdam, T.J., Marijnissen, G.H., Vergeldt, E., Kloosterman, A.B., and Sloof, W.G., (2005). Development of a pre-oxidation treatment to improve the adhesion between thermal barrier coatings and NicoCrAlY bond coatings. Oxidation of Metals. Vol. 66. Nos. 5/6. Dec. 2006.

EP Search Report for EP 11156567.7, dated Apr. 26, 2011.

* cited by examiner

COMPOSITE ARTICLE HAVING METAL-CONTAINING LAYER WITH PHASE-SPECIFIC SEED PARTICLES AND METHOD THEREFOR

BACKGROUND

This disclosure relates to articles that have metal-containing layers that oxidize.

Gas turbine engine components are typically subjected to relatively high operating temperatures. To protect from the high temperature, the component can include a protective thermal barrier layer system. Typically, the layer system includes a ceramic layer and a bond layer between the ceramic layer and the component to facilitate adherence of the ceramic layer. The bond layer typically includes aluminum that oxidizes to form alumina. At least a portion of the alumina forms during use of the component. During use, the component is subjected to a range of temperatures that can cause formation of different phases of alumina.

SUMMARY

A composite article according to an exemplary aspect of the present disclosure includes a substrate and a metal-containing layer on the substrate. The metal of the metal-containing layer is oxidizable to a plurality of different oxide phases. The metal-containing layer includes a plurality of phase-specific seed particles which promote formation of a selected one of the plurality of different oxide phases.

In a further non-limiting embodiment of any of the foregoing examples, the metal-containing layer is an aluminum-containing layer and the plurality of phase-specific seed particles are alpha-alumina seed particles.

In a further non-limiting embodiment of any of the foregoing examples, the plurality of phase-specific seed particles is located on a surface of the metal-containing layer, and an interior of the metal-containing layer is free of the plurality of phase-specific seed particles.

In a further non-limiting embodiment of any of the foregoing examples, the plurality of phase-specific seed particles cover 0.0002-50% of the area of the surface.

In a further non-limiting embodiment of any of the foregoing examples, the plurality of phase-specific seed particles are present on the surface in a concentration of $1.1 \times 10^7$ to $4.0 \times 10^{10}$ particles/centimeter squared.

In a further non-limiting embodiment of any of the foregoing examples, the plurality of phase-specific alpha-alumina seed particles is dispersed through an interior of the metal-containing layer.

In a further non-limiting embodiment of any of the foregoing examples, the plurality of phase-specific seed particles has an average size of 10-4000 nanometers.

In a further non-limiting embodiment of any of the foregoing examples, the average size is 20-200 nanometers.

In a further non-limiting embodiment of any of the foregoing examples, the plurality of phase-specific seed particles is substantially pure alpha-alumina.

In a further non-limiting embodiment of any of the foregoing examples, the plurality of phase-specific seed particles is agglomerates of alpha-alumina grains.

A further non-limiting embodiment of any of the foregoing examples, a ceramic layer is bonded directly to an oxide layer of the metal-containing layer.

A gas turbine engine according to an exemplary aspect of the present disclosure includes an optional fan, a compressor section, a combustor in fluid communication with the compressor section and a turbine section in fluid communication with the combustor. The turbine section includes a composite article having a substrate and a metal-containing layer on the substrate. The metal of the metal-containing layer is oxidizable to a plurality of different oxide phases and the metal-containing layer includes a plurality of phase-specific seed particles promoting formation of a selected one of the plurality of different oxide phases.

In a further non-limiting embodiment of any of the foregoing examples, the plurality of phase-specific seed particles is located on a surface of the metal-containing layer, and an interior of the metal-containing layer is free of the plurality of phase-specific seed particles.

In a further non-limiting embodiment of any of the foregoing examples, the plurality of phase-specific seed particles is dispersed through an interior of the metal-containing layer.

In a further non-limiting embodiment of any of the foregoing examples, the plurality of phase-specific seed particles is substantially pure alpha-alumina.

A method for providing a phase-specific layer according to an exemplary aspect of the present disclosure includes seeding a metal-containing layer with a plurality of phase-specific seed particles. The metal of the metal-containing layer is oxidizable to a plurality of different oxide phases. The metal-containing layer is then subjected to a thermal treatment to nucleate and grow a selected one of the plurality of different oxide phases in the aluminum-containing layer from the a plurality of phase-specific seed particles.

In a further non-limiting embodiment of any of the foregoing examples, the seeding includes depositing the plurality of phase-specific seed particles on a surface of the metal-containing layer, wherein an interior of the metal-containing layer is free of the plurality of phase-specific seed particles.

In a further non-limiting embodiment of any of the foregoing examples, the seeding includes applying a slurry of the plurality of phase-specific seed particles to the surface.

In a further non-limiting embodiment of any of the foregoing examples, the slurry has the plurality of phase-specific seed particles and a carrier fluid, and the slurry has a concentration of the plurality of phase-specific seed particles of less than 1 gram per liter of slurry.

In a further non-limiting embodiment of any of the foregoing examples, the seeding includes mixing the plurality of phase-specific seed particles with a plurality of metal-containing particles, and then depositing the mixture on a substrate.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
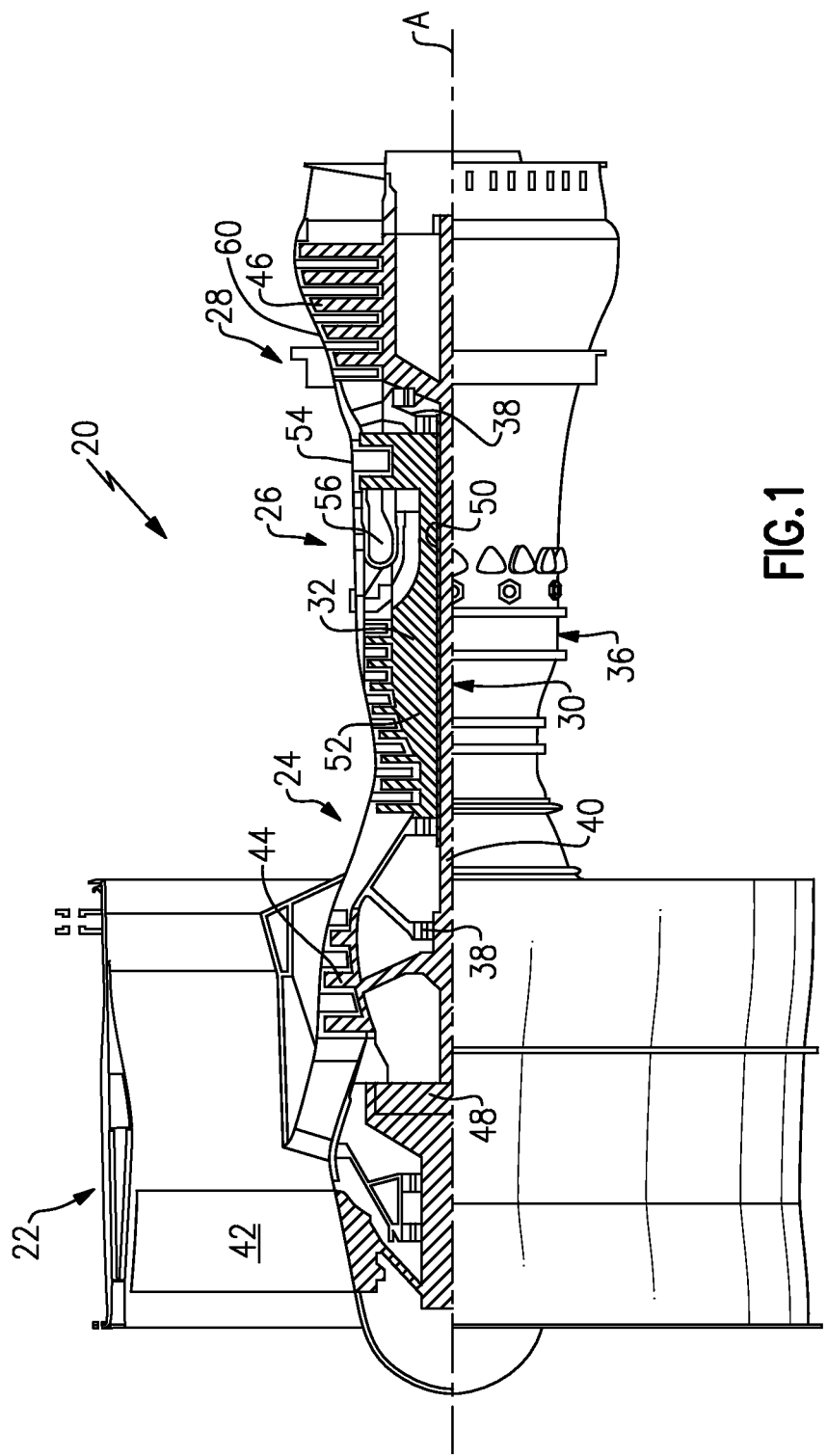
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 is connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

The engine 20 is a high-bypass geared aircraft engine that has a bypass ratio that is greater than about six (6), with an example embodiment being greater than ten (10), the gear assembly of the fan drive gear system 48 is an epicyclic gear train, such as a planetary gear system or other gear system, with a gear reduction ratio of greater than about 2.3:1 and the first turbine 46 has a pressure ratio that is greater than about 5. The first turbine 46 pressure ratio is pressure measured prior to inlet of first turbine 46 as related to the pressure at the outlet of the first turbine 46 prior to an exhaust nozzle. The first turbine 46 has a maximum rotor diameter and the fan 42 has a fan diameter such that a ratio of the maximum rotor diameter divided by the fan diameter is less than 0.6. It should be understood, however, that the above parameters are only exemplary.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 feet, with the engine at its best fuel consumption. To make an accurate comparison of fuel consumption between engines, fuel consumption is reduced to a common denominator, which is applicable to all types and sizes of turbojets and turbofans. The term is thrust specific fuel consumption, or TSFC. This is an engine's fuel consumption in pounds per hour divided by the net thrust. The result is the amount of fuel required to produce one pound of thrust. The TSFC unit is pounds per hour per pounds of thrust (lb/hr/lb Fn). When it is obvious that the reference is to a turbojet or turbofan engine, TSFC is often simply called specific fuel consumption, or SFC. "Low fan pressure ratio" is the pressure ratio across the fan blade alone, without a Fan Exit Guide Vane system. The low fan pressure ratio as disclosed herein according to one non-limiting embodiment is less than about 1.45. "Low corrected fan tip speed" is the actual fan tip speed in feet per second divided by an industry standard temperature correction of $[(Tram\ °R)/(518.7°R)]^{0.5}$. The "Low corrected fan tip speed" as disclosed herein according to one non-limiting embodiment is less than about 1150 feet per second.

Figure 2:
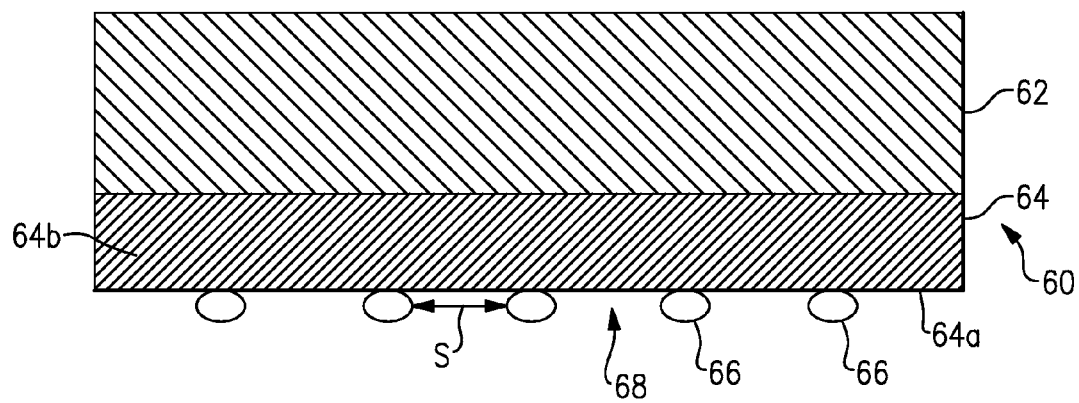
FIG. 2 illustrates an example composite article having a metal-containing layer and phase-specific seed particles thereon.

Referring to FIG. 2, with continued reference to FIG. 1, a representative portion of a composite article 60 of the turbine section 28 of the gas turbine engine 20 is shown. For example, the composite article 60 can be a blade outer air seal that is located radially outwards from rotatable turbine blades in the turbine section 28. In another example, the composite article 60 can be a blade or vane. It is to be appreciated that the examples herein are not limited to blade outer air seals, blades or vanes and can be applied to other engine or non-engine components that would benefit from this disclosure. As will be described in more detail below, the composite article 60 includes features that favor the formation of a specific oxide phase over other oxide phases.

In this example, the composite article 60 includes a substrate 62 and a metal-containing layer 64 on the substrate 62. The substrate 62 can be a metallic material, such as a nickel or cobalt-based alloy. However, it is to be understood that the substrate 62 is not limited to metallic materials and can alternatively be a ceramic material, or composite material including ceramic and/or metallic materials.

In this example, the metal-containing layer 64 is disposed directly on the substrate 62. The metal-containing layer 64 includes a metal that can oxidize to any of a plurality of different oxide phases. For example, aluminum can oxidize to alumina, spinels or other non-alpha-alumina phases. The resultant oxidation to different oxide phases, depends on the oxidizing conditions and composition of layer 64 For purposes of this disclosure, the examples herein are may be based upon aluminum and a desired formation of alumina; however, it is to be appreciated that the examples are equally applicable to other metal and oxide systems where there is a desire to form one type of oxide phase over other competing oxide phases.

The metal-containing layer 64 includes a plurality of phase-specific seed particles 66. In this example, the phase-specific seed particles 66 are located on a surface 64a of the metal-containing layer 64. An interior 64b of the metal-containing layer 64 is free of the phase-specific seed particles 66. That is, the phase-specific seed particles 66 are only on the surface 64a.

In a further example, the phase-specific seed particles 66 are present in a selected surface concentration to cover a selected amount of the surface 64a. For example, the phase-specific seed particles 66 are present with a surface concentration of $1\times10^7$ to $4\times10^{10}$ particles/centimeter squared and cover 0.0002%-50% of the area of the surface 64a. Additional examples are shown in Table 1 below. The given surface concentration and coverage percentage provide an average design spacing S between centers of adjacent phase-specific seed particles 66 of 0.05 to 3.0 microns. Additionally, the given concentration and average design spacing S provide open areas 68 between the phase-specific seed particles 66 where the metal-containing 64 has free surface areas, such as for the deposition of a ceramic layer. While the fraction of surface covered and the mass of particles 66 per area vary widely with the size of the seed particles 66, as seen in Table 2 below, the function of the seed particles 66 is maintained irrespective of particle diameter. Practical limitations dictate that the seed particles 66 are in the range of 10 nanometers to 3 microns in diameter. As shown in Table 3 below, the mass of seed particles 66 per area also varies with the size of the seed particles 66 and selected spacing.

TABLE 1

Particles per square centimeter assuming ideal hexagonal close packed distribution.

| spacing (microns) | 0.05 | 0.1 | 0.2 | 0.3 | 0.4 | 0.5 | 1 | 1.5 | 2 | 3 |
|---|---|---|---|---|---|---|---|---|---|---|
| particles per sq. cm | 4.0.E+10 | 1.0.E+10 | 2.5.E+09 | 1.1.E+09 | 6.3.E+08 | 4.0.E+08 | 1.0.E+08 | 4.4.E+07 | 2.5.E+07 | 1.1.E+07 |

TABLE 2

Percent of surface covered assuming ideal hexagonal close packed distribution.

| diameter (nanometers) | spacing (microns) | | | | | | | | | |
|---|---|---|---|---|---|---|---|---|---|---|
| | 0.05 | 0.1 | 0.2 | 0.3 | 0.4 | 0.5 | 1 | 1.5 | 2 | 3 |
| 10 | 0.79% | 0.20% | 0.05% | 0.02% | 0.01% | 0.008% | 0.002% | 0.0009% | 0.0005% | 0.0002% |
| 20 | 3.14% | 0.79% | 0.20% | 0.09% | 0.05% | 0.03% | 0.01% | 0.003% | 0.002% | 0.001% |
| 30 | 7.07% | 1.77% | 0.44% | 0.20% | 0.11% | 0.07% | 0.02% | 0.008% | 0.004% | 0.002% |
| 40 | 12.57% | 3.14% | 0.79% | 0.35% | 0.20% | 0.13% | 0.03% | 0.01% | 0.01% | 0.003% |
| 50 | 19.63% | 4.91% | 1.23% | 0.55% | 0.31% | 0.20% | 0.05% | 0.02% | 0.01% | 0.01% |
| 60 | 28.27% | 7.07% | 1.77% | 0.79% | 0.44% | 0.28% | 0.07% | 0.03% | 0.02% | 0.01% |
| 70 | 38.48% | 9.62% | 2.41% | 1.07% | 0.60% | 0.38% | 0.10% | 0.04% | 0.02% | 0.01% |
| 80 | | 12.57% | 3.14% | 1.40% | 0.79% | 0.50% | 0.13% | 0.06% | 0.03% | 0.01% |
| 90 | | 15.90% | 3.98% | 1.77% | 0.99% | 0.64% | 0.16% | 0.07% | 0.04% | 0.02% |
| 100 | | 19.63% | 4.91% | 2.18% | 1.23% | 0.79% | 0.20% | 0.09% | 0.05% | 0.02% |
| 200 | | | 19.63% | 8.73% | 4.91% | 3.14% | 0.79% | 0.35% | 0.20% | 0.09% |
| 300 | | | 44.18% | 19.63% | 11.04% | 7.07% | 1.77% | 0.79% | 0.44% | 0.20% |
| 400 | | | | 34.91% | 19.63% | 12.57% | 3.14% | 1.40% | 0.79% | 0.35% |
| 500 | | | | | 30.68% | 19.63% | 4.91% | 2.18% | 1.23% | 0.55% |
| 1000 | | | | | | | 19.63% | 8.73% | 4.91% | 2.18% |
| 2000 | | | | | | | | 34.91% | 19.63% | 8.73% |
| 3000 | | | | | | | | | 44.18% | 19.63% |
| 4000 | | | | | | | | | | 34.91% |

TABLE 3

Mass of alumina per area (grams/square meter) assuming ideal hexagonal close packed distribution.

| diameter (nanometers) | spacing (microns) | | | | | | | | | |
|---|---|---|---|---|---|---|---|---|---|---|
| | 0.05 | 0.1 | 0.2 | 0.3 | 0.4 | 0.5 | 1 | 1.5 | 2 | 3 |
| 10 | 9.2E−04 | 2.3E−04 | 5.8E−05 | 2.6E−05 | 1.4E−05 | 9.2E−06 | 2.3E−06 | 1.0E−06 | 5.8E−07 | 2.6E−07 |
| 20 | 7.4E−03 | 1.8E−03 | 4.6E−04 | 2.0E−04 | 1.2E−04 | 7.4E−05 | 1.8E−05 | 8.2E−06 | 4.6E−06 | 2.0E−06 |
| 30 | 2.5E−02 | 6.2E−03 | 1.6E−03 | 6.9E−04 | 3.9E−04 | 2.5E−04 | 6.2E−05 | 2.8E−05 | 1.6E−05 | 6.9E−06 |
| 40 | 5.9E−02 | 1.5E−02 | 3.7E−03 | 1.6E−03 | 9.2E−04 | 5.9E−04 | 1.5E−04 | 6.6E−05 | 3.7E−05 | 1.6E−05 |
| 50 | 1.2E−01 | 2.9E−02 | 7.2E−03 | 3.2E−03 | 1.8E−03 | 1.2E−03 | 2.9E−04 | 1.3E−04 | 7.2E−05 | 3.2E−05 |
| 60 | 2.0E−01 | 5.0E−02 | 1.2E−02 | 5.5E−03 | 3.1E−03 | 2.0E−03 | 5.0E−04 | 2.2E−04 | 1.2E−04 | 5.5E−05 |
| 70 | 3.2E−01 | 7.9E−02 | 2.0E−02 | 8.8E−03 | 4.9E−03 | 3.2E−03 | 7.9E−04 | 3.5E−04 | 2.0E−04 | 8.8E−05 |
| 80 | | 1.2E−01 | 2.9E−02 | 1.3E−02 | 7.4E−03 | 4.7E−03 | 1.2E−03 | 5.2E−04 | 2.9E−04 | 1.3E−04 |
| 90 | | 1.7E−01 | 4.2E−02 | 1.9E−02 | 1.0E−02 | 6.7E−03 | 1.7E−03 | 7.5E−04 | 4.2E−04 | 1.9E−04 |
| 100 | | 2.3E−01 | 5.8E−02 | 2.6E−02 | 1.4E−02 | 9.2E−03 | 2.3E−03 | 1.0E−03 | 5.8E−04 | 2.6E−04 |
| 200 | | | 4.6E−01 | 2.0E−01 | 1.2E−01 | 7.4E−02 | 1.8E−02 | 8.2E−03 | 4.6E−03 | 2.0E−03 |
| 300 | | | 1.6E+00 | 6.9E−01 | 3.9E−01 | 2.5E−01 | 6.2E−02 | 2.8E−02 | 1.6E−02 | 6.9E−03 |
| 400 | | | | 1.6E+00 | 9.2E−01 | 5.9E−01 | 1.5E−01 | 6.6E−02 | 3.7E−02 | 1.6E−02 |
| 500 | | | | | 1.8E+00 | 1.2E+00 | 2.9E−01 | 1.3E−01 | 7.2E−02 | 3.2E−02 |
| 1000 | | | | | | | 2.3E+00 | 1.0E+00 | 5.8E−01 | 2.6E−01 |

TABLE 3-continued

Mass of alumina per area (grams/square meter) assuming ideal hexagonal close packed distribution.

| diameter (nanometers) | spacing (microns) | | | | | | | | | |
|---|---|---|---|---|---|---|---|---|---|---|
| | 0.05 | 0.1 | 0.2 | 0.3 | 0.4 | 0.5 | 1 | 1.5 | 2 | 3 |
| 2000 | | | | | | | | 8.2E+00 | 4.6E+00 | 2.0E+00 |
| 3000 | | | | | | | | | 1.6E+01 | 6.9E+00 |
| 4000 | | | | | | | | | | 1.6E+01 |

The phase-specific seed particles 66 promote the nucleation and growth of the same phase as the phase-specific seed particles 66 upon oxidation of the metal of the metal-containing layer 64. In one example, the metal is aluminum in an aluminum-containing layer of MCrAlY, where the M includes at least one of nickel, cobalt, iron, or a combination thereof, Cr is chromium, Al is aluminum, and Y is yttrium. Aluminum-containing layers oxidize prior to and during operation when subjected to relatively high operating temperatures. Over the range of the operating temperatures, and especially at relatively lower temperatures in the range of 1700-1900° F. (927-1038° C.), metastable spinels and non-alpha-alumina phases form. At higher temperatures, such as approximately 2000° F. (1093° C.) and above, oxygen diffusion is slowed by the formation of these oxides and alpha-alumina forms. However, the non-alpha-alumina is generally weaker and thus can lead to spallation of the thermally grown oxide (TGO) layer and barrier layers that may be applied thereon. The presence of alpha-alumina phase-specific seed particles 66 in the aluminum metal-containing layer 64 reduces the time and temperature necessary for nucleation and growth of alpha-alumina from the aluminum in the metal-containing layer 64. Thus, the phase-specific seed particles 66 in this example favor or promote alpha-alumina formation over the formation of other oxides or non-alpha-alumina. Given this description, one of ordinary skill in the art will be able to select metals other than aluminum and phase-specific seed particles 66 other than alpha-alumina to meet their particular needs.

Figure 3:
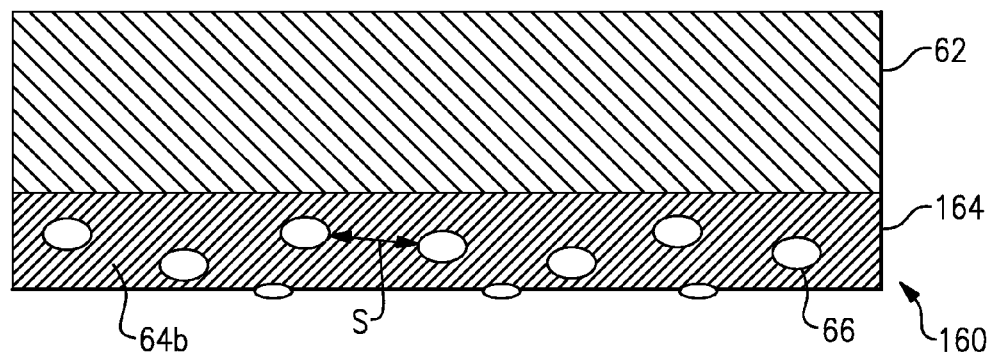
FIG. 3 illustrates another example composite article having a metal-containing layer with phase-specific seed particles dispersed throughout.

FIG. 3 shows another example composite article 160. In this disclosure, like reference numerals designate like elements where appropriate and reference numerals with the addition of one-hundred or multiples thereof designate modified elements that are understood to incorporate the same features and benefits of the corresponding elements. In this example, the phase-specific seed particles 66 are dispersed through the interior 64b of the metal-containing layer 164 rather than only on the surface 64a as in the example of FIG. 2.

Figure 4:
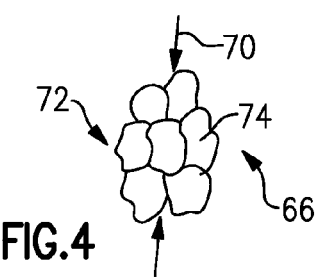
FIG. 4 illustrates a representative alpha-alumina seed particle.

FIG. 4 shows an example of one of the phase-specific seed particles 66. In this example, the phase-specific seed particle 66 has an average size 70 of 10-500 nanometers. In a further example, the average size 70 is 10-200 nanometers. The phase-specific seed particle 66 can further have an average specific surface area of approximately 10 meters squared per gram, although the surface area may be varied.

The phase-specific seed particles 66 can be agglomerates 72 of phase-specific grains 74, polycrystalline particles, such as alpha-alumina grains, or single crystals. For example, the phase-specific seed particles 66 can be agglomerates of the grains 74, agglomerates of polycrystalline particles having grains 74 or agglomerates of single crystals. In one example, the grains 74 have an average minimum dimension of approximately 10 nanometers, below which the grains 74 tend to hydrate or exhibit amorphous crystal structure.

Additionally, the phase-specific seed particle 66 in this example can be substantially pure with respect to the selected phase, to the exclusion of other oxide phases. In one example, the phase-specific seed particles 66 have a purity of 90% or greater, and even more preferably have a purity of 99% or greater.

Figure 5:
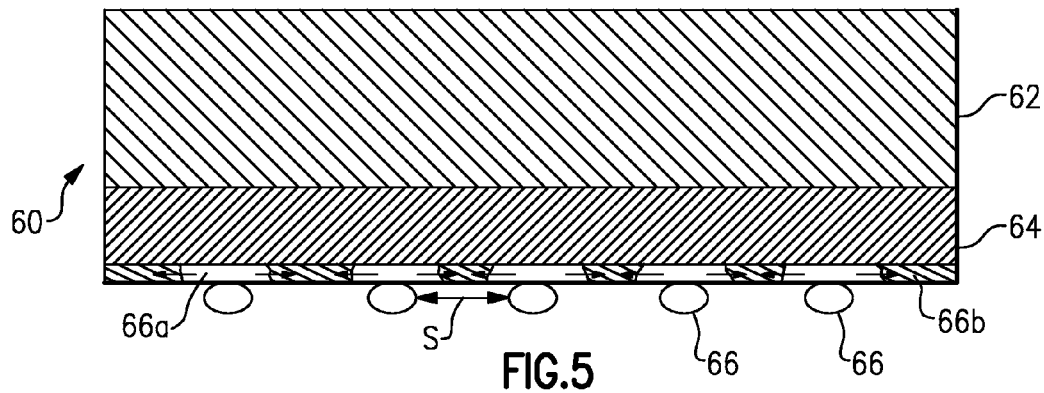
FIG. 5 illustrates a composite article with nucleation and growth of alpha-alumina from alpha-alumina seed particles.

As shown in FIG. 5, upon thermal treatment of the composite article 60, including the metal-containing layer 64, the phase-specific seed particles 66 promote the nucleation and growth of the selected phase 66a in the non-ideal phase thermally grown oxide layer 66b at the surface of the metal-containing layer 64. The metal-containing layer 64 thus grows a thin protective layer of alumina, known as a thermally grown oxide, that limits the diffusion rate of oxygen into the metal-containing layer 64 so that further oxidation is slowed.

Figure 6:
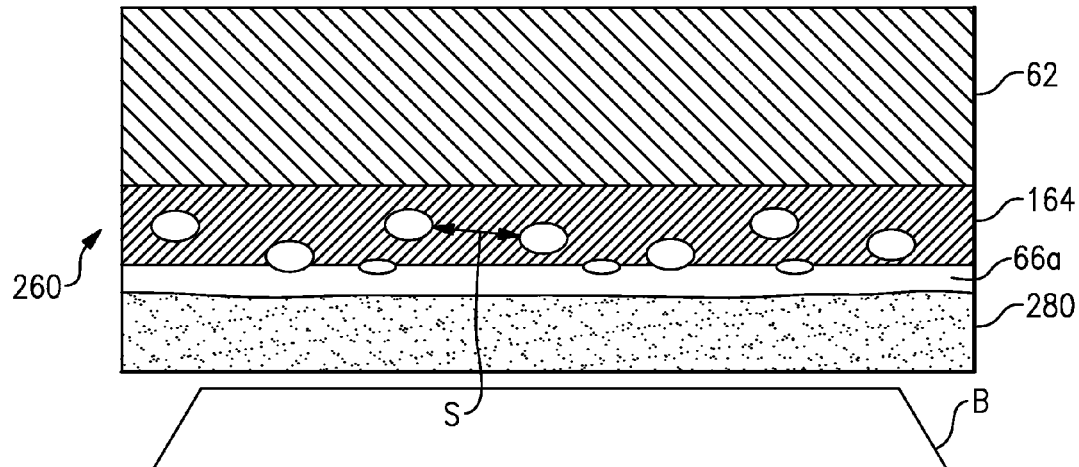
FIG. 6 illustrates another example composite article having a metal-containing layer with phase-specific seed particles and a ceramic layer on the metal-containing layer.

FIG. 6 shows another example composite article 260 that is somewhat similar to the composite article 160 shown in FIG. 3, but additionally includes a ceramic layer 280 disposed on the metal-containing layer 164. In this example, the ceramic layer 280 is bonded directly to the layer of the selected phase 66a grown on the metal-containing layer 164. In this example, the ceramic layer 280 is used as an abradable layer on a blade outer air seal that is located radially outward of a rotatable blade B. Similarly, the ceramic layer 280 can be used on the composite article 60 of FIG. 5, wherein the ceramic layer 280 is deposited over the phase-specific seed particles 66 and layer of the selected phase 66a. Even with limited growth of the selected phase 66a without heat treatment, there is a very thin oxide layer on the metal-containing layer 64/164. The initial stage of growth is the non-alpha alumina phases, which are then converted to alpha-phase with time, temperature and the interaction with the seed particles 66.

Figure 7:
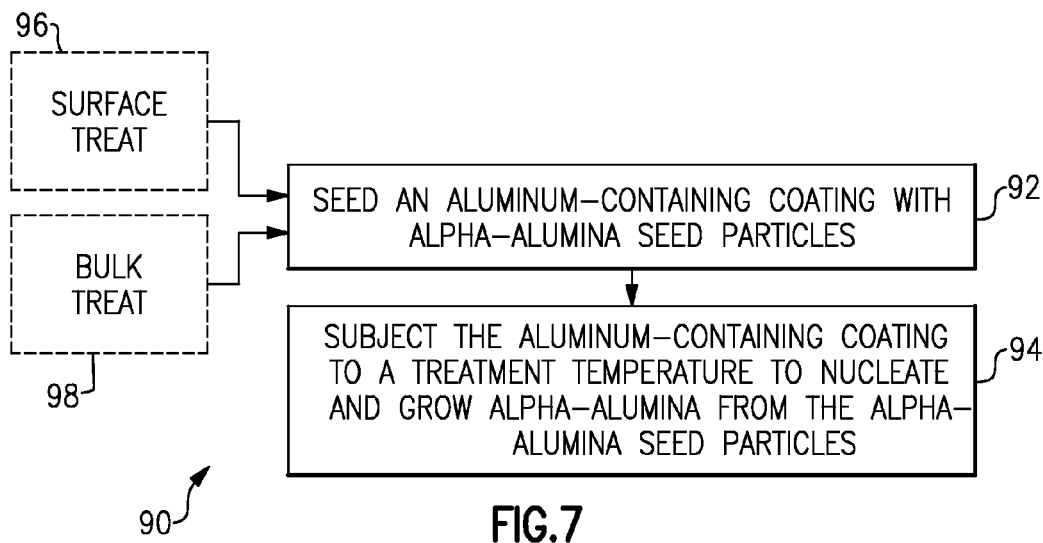
FIG. 7 illustrates a method for providing a phase-specific layer.

FIG. 7 shows a method 90 for providing a phase-specific layer, such as in the metal-containing layers 64/164. In this example, the method 90 includes a seeding step 92 and a thermal treatment step 94. In the seeding step 92, the metal-containing layer 64/164 is seeded with the phase-specific seed particles 66. In the thermal treatment step 94, the metal-containing layer 64/164 is subjected to a thermal treatment to nucleate and grow the selected phase 66a in the metal-containing layer 64/164 from the phase-specific seed particles 66. The method 90 can lower processing cost and improve efficiency because the phase-specific seed particles 66 can be uniformly distributed and therefore used in a minimum amount for effectiveness. The seeding concentration and coverage area can also be tailored to desired levels and to a particular thermal treatment. The thermal treatment may be performed passively during coating service.

The seeding of the metal-containing layer 64/164 can be conducted through one of various different techniques. For example, the techniques can include a surface treatment 96 or a bulk treatment 98, depending upon which of the metal-containing layers 64 or 164 is to be provided. The surface treatment 96 can be used to produce the metal-containing layer 64 with the phase-specific seed particles 66 on the surface 64a, and the bulk treatment 98 can be used to provide the metal-containing layer 164 with the phase-specific particles 66 dispersed throughout the interior 64b.

In one example, the surface treatment 96 includes applying the phase-specific seed particles 66 using a slurry. The slurry includes the phase-specific seed particles 66 mixed with a carrier fluid, such as an organic solvent. The organic solvent can be water, alcohol or combinations thereof. The slurry can be prepared with a target concentration of the phase-specific seed particles 66 to thus provide a target coverage and surface concentration of the phase-specific seed particles 66 on the surface 64a of the metal-containing layer 64. In one example, the concentration of the phase-specific seed particles 66 in the slurry is 0.1 grams of 40 nanometer diameter seed particles per liter of slurry.

The slurry is then applied to the surface 64a of the metal-containing layer 64 and dried to remove the solvent such that the phase-specific seed particles 66 remain adhered on the surface 64a. The slurry can be applied by suspension spraying, dipping, painting, thermal spraying or other technique. At the relatively small average size 70 of the phase-specific seed particles 66, no binder is needed for adhesion to the surface 64a due to the high surface energy of the very small particles and the action of van der Waals forces between the metal surface and the particles. However, it is to be understood that in other examples, a binder may be used. In one example, the slurry is applied at a rate of 40 milliliters per square meter of bond coated surface area by dipping.

In another example, the bulk treatment 98 includes mixing the phase-specific seed particles 66 with metal-containing powder particles and then depositing the mixture onto the substrate 62. For example, a similar slurry as above can be provided and mixed with the metal-containing powder particles to disperse the phase-specific seed particles 66 on the surfaces of the metal-containing powder particles. The mixture can then be applied to the substrate 62, such as by thermal spraying. If used, the ceramic layer 280 can then be applied in a known manner on the metal-containing layer 64/164.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A composite article comprising:
    a substrate; and
    a metal-containing layer on the substrate, the metal of the metal-containing layer being oxidizable to a plurality of different oxide phases, the metal-containing layer including a plurality of phase-specific seed particles promoting formation of a selected one of the plurality of different oxide phases, wherein the plurality of phase-specific seed particles are dispersed through an interior of the metal-containing layer.

2. The composite article as recited in claim 1, wherein the metal-containing layer is an aluminum-containing layer and the plurality of phase-specific seed particles are alpha-alumina seed particles.

3. The composite article as recited in claim 1, wherein the plurality of phase-specific seed particles have an average size of 10-4000 nanometers.

4. The composite article as recited in claim 3, wherein the average size is 20-200 nanometers.

5. The composite article as recited in claim 1, wherein the plurality of phase-specific seed particles are substantially pure alpha-alumina.

6. The composite article as recited in claim 1, wherein the plurality of phase-specific seed particles are agglomerates of alpha-alumina grains.

7. The composite article as recited in claim 1, further comprising a ceramic layer bonded directly to an oxide layer of the metal-containing layer.

8. A composite article comprising:
    a substrate; and
    a metal-containing layer on the substrate, the metal of the metal-containing layer being oxidizable to a plurality of different oxide phases, the metal-containing layer including a plurality of phase-specific seed particles promoting formation of a selected one of the plurality of different oxide phases, wherein the plurality of phase-specific seed particles is located on a surface of the metal-containing layer, and an interior of the metal-containing layer is free of the plurality of phase-specific seed particles, and wherein the plurality of phase-specific seed particles cover 0.0002-50% of the area of the surface.

9. The composite article as recited in claim 8, wherein the plurality of phase-specific seed particles are present on the surface in a concentration of $1.1 \times 10^7$ to $4.0 \times 10^{10}$ particles/centimeter squared.

10. The composite article as recited in claim 9, wherein the plurality of phase-specific seed particles have an average size of 10-4000 nanometers.

11. The composite article as recited in claim 10, wherein the average size is 20-200 nanometers.

12. The composite article as recited in claim 8, wherein the metal is aluminum.

13. A gas turbine engine comprising:
    optionally, a fan;
    a compressor section;
    a combustor in fluid communication with the compressor section; and
    a turbine section in fluid communication with the combustor, the turbine section including a composite article having a substrate and a metal-containing layer on the substrate, the metal of the metal-containing layer being oxidizable to a plurality of different oxide phases, the metal-containing layer including a plurality of phase-specific seed particles promoting formation of a selected one of the plurality of different oxide phases, wherein the plurality of phase-specific seed particles are dispersed through an interior of the metal-containing layer.

14. The gas turbine engine as recited in claim 13, wherein the plurality of phase-specific seed particles are substantially pure alpha-alumina.

15. The gas turbine engine as recited in claim 13, wherein the plurality of phase-specific seed particles have an average size of 10-4000 nanometers.

16. The gas turbine engine as recited in claim 15, wherein the average size is 20-200 nanometers.

17. The gas turbine engine as recited in claim 13, wherein the metal is aluminum.

18. A method for providing a phase-specific layer, the method comprising:
    seeding a metal-containing layer with a plurality of phase-specific seed particles, the metal of the metal-containing layer being oxidizable to a plurality of different oxide phases, wherein the plurality of phase-specific seed particles are dispersed through an interior of the metal-containing layer; and
    subjecting the metal-containing layer to a thermal treatment to nucleate and grow a selected one of the plurality of different oxide phases in the metal-containing layer from the a plurality of phase-specific seed particles.

19. The method as recited in claim 18, wherein the seeding includes mixing the plurality of phase-specific seed particles with a plurality of metal-containing particles, and then depositing the mixture on a substrate.

20. The method as recited in claim 18, wherein the plurality of phase-specific seed particles have an average size of 10-4000 nanometers.

21. The method as recited in claim 20, wherein the average size is 20-200 nanometers.

22. The method as recited in claim 18, wherein the metal is aluminum.

* * * * *